United States Patent [19]
Kittridge

[11] Patent Number: 5,651,242
[45] Date of Patent: Jul. 29, 1997

[54] LAWN MOWER CLEANING DEVICE

[76] Inventor: John Kittridge, 4217 Highland Rd., Suite 230, Waterford, Mich. 48320

[21] Appl. No.: 530,878

[22] Filed: Sep. 20, 1995

[51] Int. Cl.$^6$ .............................. A01D 75/10; A62C 31/22
[52] U.S. Cl. .......................... 56/12.1; 56/16.7; 239/276; 239/279
[58] Field of Search ...................... 56/12.1, DIG. 2, 56/16.7; 239/DIG. 6, 279, 276, 567, 562

[56] References Cited

U.S. PATENT DOCUMENTS

| | | | |
|---|---|---|---|
| 648,263 | 4/1900 | Hull | 239/567 |
| 2,456,703 | 12/1948 | Hatchette | 239/562 X |
| 2,771,320 | 11/1956 | Korwin | 239/279 |
| 3,040,990 | 6/1962 | Gotti | 56/12.1 X |
| 3,108,608 | 10/1963 | Mahowald | 239/DIG. 6 X |
| 3,233,347 | 2/1966 | Pierce | 239/DIG. 6 X |
| 3,856,028 | 12/1974 | Kehler | 134/198 |
| 4,562,963 | 1/1986 | Butler | 239/273 |
| 4,762,278 | 8/1988 | Taylor | 239/DIG. 6 X |
| 4,784,327 | 11/1988 | Lund | 56/12.1 X |
| 5,152,459 | 10/1992 | Boeh | 239/DIG. 6 X |
| 5,273,214 | 12/1993 | Huffstutler | 239/279 |
| 5,312,047 | 5/1994 | Akers | 239/276 |

*Primary Examiner*—Terry Lee Melius
*Assistant Examiner*—Thomas A. Beach
*Attorney, Agent, or Firm*—Gifford, Krass, Groh, Sprinkle, Patmore, Anderson & Citkowski, P.C.

[57] ABSTRACT

The lawn mower cleaning device includes a base portion having a front portion, a rear portion, and two opposing side portions extending between the front and rear portions. A spraying member extends between the front and rear portions. The spraying member has a plurality of spaced orifices arranged in three rows facing outward from the member. A hose coupler is in fluid connection to the front portion of the device so that fluid can flow from the front portion, through the side portions and rear portion, through the spraying member, and then out through the orifices. A handle is further provided within the front portion for easy handling of the device. The device is manufactured by laminating two sheets of plastic together, such that when coupled together, the sheets form a passageway therein whereby fluid can flow.

3 Claims, 1 Drawing Sheet

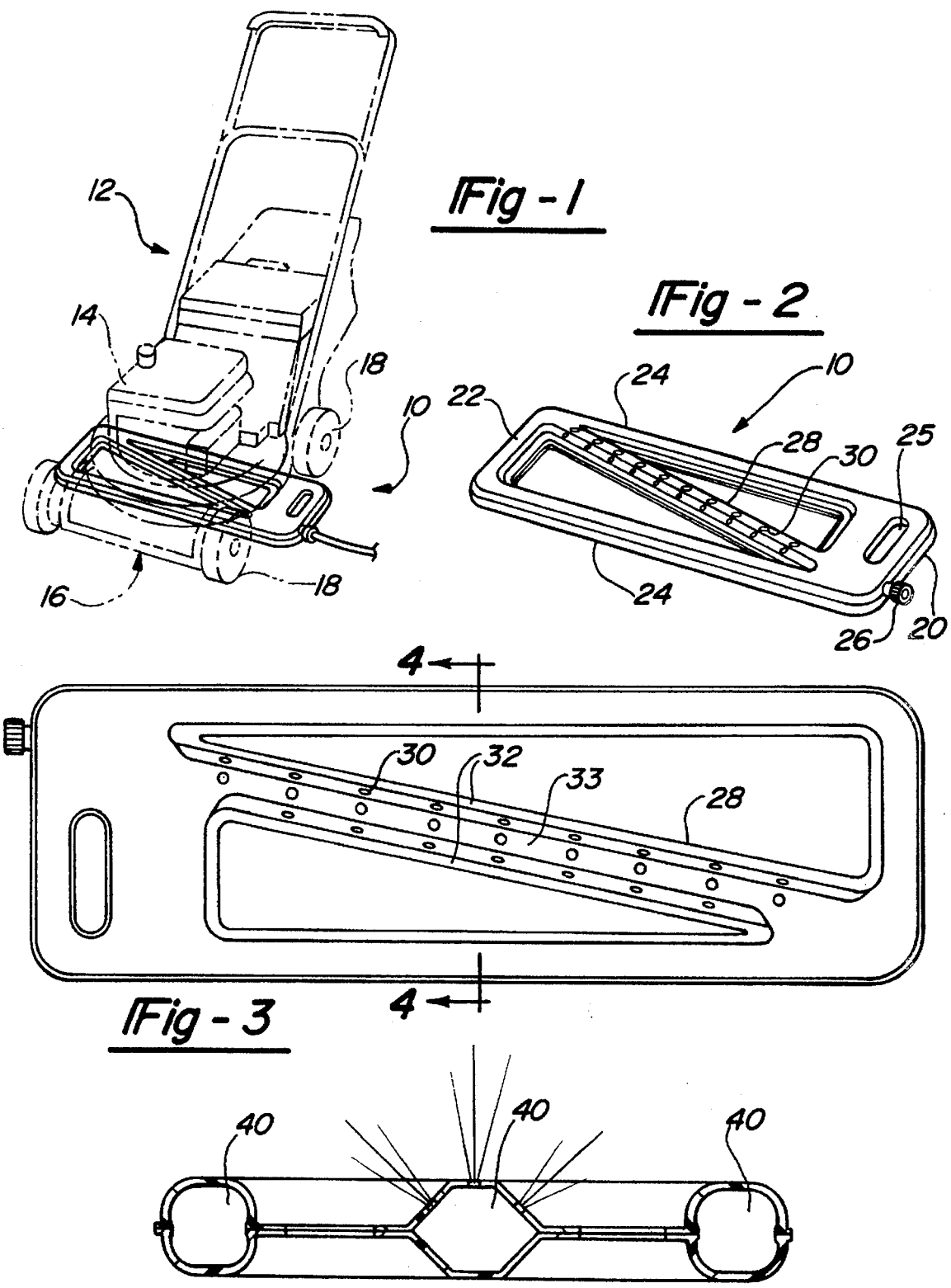

LAWN MOWER CLEANING DEVICE

BACKGROUND OF THE INVENTION

1. Field of the Invention

The present invention relates, in general, to the cleaning of lawn mowers, and more particularly to a novel lawn mower cleaning device, and method of manufacturing the device, that effectively cleans the underside of a lawn mower.

2. Background of the Invention

A major problem with the use of typical lawn mowers is the tendency of cut grass particles, especially when wet, to stick to the underside of the lawn mower. As the user continues to mow the lawn, the grass particles may become compacted on the underside of the lawn mower to such an extent as to obstruct the movement of the cutting blade and greatly reduce the effectiveness of the mower.

To remove the grass from the underside of the lawn mower, the user must necessarily turn off the mower and invert it or at least turn the mower on its side. With the mower suitably positioned, the user would then need to manually remove the grass from the underside of the mower. The risks associated with manually removing the grass are substantial. Not only may the user damage the mower by causing gasoline to leak on the exhaust manifold, but the user may even injure himself on the cutting blade. Therefore, it would be advantageous to provide an automatic cleaning device which allows the user to clean the mower quickly, easily and without risk to the user.

Lawn mower cleaning devices are known. U.S. Pat. No. 3,856,028 issued to Kehler discloses a platform dimensioned to allow a lawn mower to be positioned thereon. The platform has a tubular member located centrally therein and has a number of water jets extending therefrom. While Kehler solved some of the problems of the prior art, namely providing a device to automatically clean the underside of a lawn mower, the device suffers from some substantial drawbacks. Before using the device, it is necessary for the user to first lift the mower and then place it on the platform. Since typical lawn mowers weigh in excess of 40 lbs., this task could be prohibitive for some people. Moreover, the platform contains multiple parts and is expensive to manufacture.

An improved lawn mower cleaning device is disclosed in U.S. Pat. No. 5,312,047 issued to Akers. Akers discloses a spraying device for cleaning the blade chamber of a rotary lawn mower. The device has an annular D-shaped conduit having a number of spaced apertures arranged in two annular formations that define a controlled spray pattern that in conjunction with the rotating mower blade, develops a fluid spray that cleans the blade chamber. The spraying device is designed so as to fit underneath the blade chamber. A stake is provided to prevent the spraying device from lifting off the ground and interfering with the cutting blade. Although a substantial improvement over Kehler, Akers has a number of disadvantages. The spraying device consists of a complicated structure and therefore is expensive to manufacture. Moreover, a spike is needed to secure the spraying device to the ground.

Accordingly, it is therefore a general object of the present invention to provide an improved lawn mower cleaning device that is compact, light weight, simple to use, and can be used for a variety of different lawn mowers.

It is a further object of the present invention to provide a lawn mower cleaning device having a highly effective spray pattern such that portions within the blade chamber that usually get clogged and compacted with grass clippings are cleaned.

It is a further object of the present invention to provide an improved method of manufacturing a mower cleaning device whereby two sheets of plastic are laminated together such that a conduit is formed therebetween suitable for the passage of fluid.

It is still a further object of the present invention to provide an improved lawn mower cleaning device that can be positioned on top of the ground without the need for attachment to the ground.

In accordance with these and many other objects, I have invented a unique lawn mower cleaning apparatus that solves the problems that others have failed to address.

SUMMARY OF THE PRESENT INVENTION

The lawn mower cleaning device of the present invention includes a base and two opposing side portions extending between a front and a rear portion. A spraying member extends between the front and rear portions. The spraying member has a plurality of spaced orifices arranged in rows facing outward from the member. A hose coupler is in fluid connection to the front portion of the device so that fluid can flow from the front portion, through the side portions and the spraying member, and out through the orifices. A handle is further provided within the front portion for easy handling of the device and for hanging the device from a wall. The device is manufactured by laminating two sheets of plastic together, such that when coupled together, the sheets form a passageway therein whereby fluid can flow.

In use, the device is first positioned underneath the lawn mower to be cleaned. The base is of a length longer than the width of conventional lawn mowers, thereby alleviating problems associated with the prior art whereby the device could rise from the ground and damage the blades of the mower. Once positioned, the user need only connect the hose to the hose coupler on the device and turn on the pressurized water supply. Water will flow throughout the base of the device, and then throughout the spraying member, out the orifices and into the blade chamber. The orifices define an annular spray pattern that directs water from the spraying member at an angle defined from a vertical axis of between +/−45 degrees.

BRIEF DESCRIPTION OF THE DRAWINGS

Additional objects, advantages, and features of the present invention will become apparent from the following description and appended claims, taken in conjunction with the accompanying drawings in which:

FIG. 1 is a perspective view of the present invention shown positioned underneath a lawn mower;

FIG. 2 is a perspective top view of the present invention;

FIG. 3 is a top view of the present invention; and

FIG. 4 is a cross-sectional view along lines 4—4 of FIG. 3.

DETAILED DESCRIPTION OF A PREFERRED EMBODIMENT OF THE PRESENT INVENTION

It should be understood that the following description of the preferred embodiment is merely exemplary in nature and is in no way intended to limit the invention or its applications or uses.

For example, the following description of the lawn mower cleaning device, although designed for use with conventional rotary lawn mowers having two sets of wheels, it is intended to be typical of cleaning devices that may be used in conjunction with a number of different types of lawn mowers such as riding lawn mowers and garden tractors. Modifications and variations of the present invention will readily occur to those skilled in the art.

Referring now to the drawings, in which corresponding parts are identified with the same reference numeral, and more particularly to FIG. 1, the lawn mower cleaning device of the present invention is designated generally at 10 and is shown positioned underneath a conventional rotary lawnmower 12. The lawn mower includes an engine 14 mounted on a platform that is supported by two pairs of opposed wheels 18. The platform includes a cutting chamber 16 extending between the two pair of wheels 18. The interior surface of the cutting chamber encloses the cutting blade (not shown) which rotates and cuts the grass.

As best shown in FIG. 2, the cleaning device 10 has a generally rectangular base portion defining an inner fluid chamber and having a front portion 20 and a rear portion 22, with two opposing side portions 24 extending therebetween. A spraying member 28 extends diagonally from the front portion 20 to the rear portion 22. Integral with the spraying member are a plurality of orifices, collectively designated by 30. A handle 25 is located near the front portion for ease in positioning the device. A hose coupler 26 is integral with the front portion 20.

Referring now to FIG. 3, the spraying member 28 is more particularly shown. The spraying member 28 has a pair of angled side surfaces 32 and a top surface 33. Disposed on each of the surfaces 32, 33 are a plurality of orifices 30. The orifices 30 form three annular patterns, with a row of orifices 30 integral with each surface of the spraying member. Orifices 30 that define the first annular pattern are situated parallel to the ground. Orifices 30 that define the second and third annular patterns are situated at an angle measured from the first annular pattern, preferably from 0 to +/−45 degrees.

FIG. 4 shows a cross-sectional view of the cleaning device 10, showing more particularly the fluid passageways 40 within the spraying member 28, front portion 20, rear portion 22, and opposing side portions 24. The fluid passageways 40 are interconnected such that fluid will flow throughout the cleaning device when in use.

The method of manufacturing the cleaning device 10 can be readily understood from the figures. The base of the cleaning device 10 is manufactured from two sheets of plastic, namely an upper portion having an upper half channel extending between a front portion and a rear portion and a lower portion having a lower half channel extending between a front portion and a rear portion. The upper portion and lower portion are then connected together such that the upper half channel and lower half channel form a fluid passageway. Finally, the plastic is then punctured to provide apertures to allow fluid to pass from the fluid passageway 40 out of the cleaning device.

In use, when the user decides to clean the mower, preferably shortly upon finishing the mowing, the user first places the cleaning device 10 on the ground, in a place where access to a hose or water supply is possible. Next, the user should connect the hose to hose coupling 26. At this point, the user should position the mower 12 directly over the cleaning device 10 such that the device 10 extends between the wheels 18 of the mower, as shown in FIG. 1. Finally, by turning on the water supply, water would quickly fill the cleaning device 10, and be expelled throughout the orifices 30 onto the blade chamber of the mower 12. It is not necessary that the mower 12 be operating during the cleaning operation, yet the cleaning process will likely be more effective if the blade is rotating since the blade could help circulate and throw the water or other fluid into the blade chamber. When the user is finished cleaning the mower, the procedure can be reversed.

It is important to note that the present invention has uses other than for the cleaning of the lawn mowers 12. For example, the device 10 may be used as a sprinkler to water the lawn or perhaps as a water toy for kids. These uses and others are in keeping with the spirit of the invention.

As will be apparent to one of ordinary skill in the art, the preferred embodiment of the invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit or scope of the invention as further defined in the following claims.

Having thus described my invention, I claim:

1. A cleaner device for use with a lawnmower having a pair of front wheels, a pair of rear wheels, and a blade chamber having a predetermined width and a cutting blade located therebetween, the cleaning device being adapted to rest on a lawn and adapted to extend underneath the lawnmower between the pair of front wheels and the pair of rear wheels, the lawnmower cleaner comprising:

a rectangular base portion having a pair of ends spaced apart further than the predetermined width of the blade chamber, said base having a top surface spaced apart from a bottom surface to define an inner chamber for holding fluid, said inner chamber having a fixed front and a fixed rear portion, said inner chamber further having a spray member and a pair of passageways extending between said front and rear portions, said base portion having means for delivering a supply of water into said inner chamber of said base, said spray member communicating water and extending diagonally between the rear portion and the front portion and positioned between said pair of passageways, said spray member having a plurality of orifices for dispensing a stream of fluid upwardly from said top surface into the blade chamber of the lawnmower, an elongated aperture spaced inwardly from one of said pair of ends and passing through one of said fixed front portion or said rear fixed portion of said inner chamber to form a handle for transporting and positioning the lawnmower cleaner.

2. The cleaner device of claim 1, wherein the spray member has a plurality of angularly displaced faces, said faces each having a plurality of orifices such that water is dispersed from the spay member in multiple directions.

3. The lawn mower cleaning device of claim 1, wherein the base portion is made of plastic.

* * * * *